July 24, 1934.  G. JOHNSON  1,967,670
SLIDE FASTENER
Filed Dec. 15, 1932
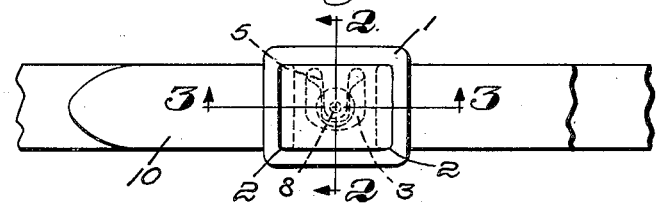
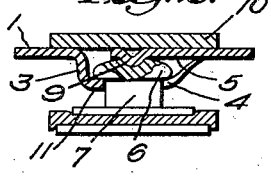 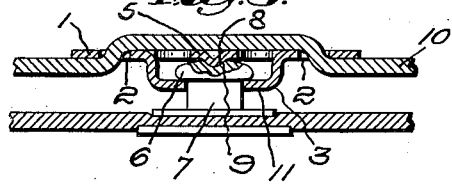
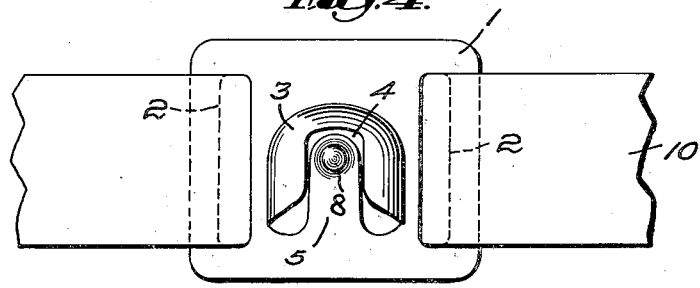
 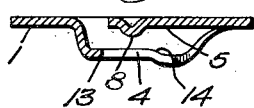
Inventor:
Gustav Johnson,
by Emery, Booth, Varney & Townsend
Attys Patented July 24, 1934

1,967,670

UNITED STATES PATENT OFFICE 1,967,670

SLIDE FASTENER

Gustav Johnson, West Roxbury, Mass., assignor to United-Carr Fastener Corporation, Cambridge, Mass., a corporation of Massachusetts Application December 15, 1932, Serial No. 647,371

3 Claims. (Cl. 24—77)

My invention aims to provide improvements in slide fasteners.

In the drawing which illustrates a preferred embodiment of my invention:—

Figure 1 is a plan view of a complete fastener installation embodying my improved fastener;

Fig. 2 is an enlarged section taken on the line 2—2 of Figure 1, the stud being partly in elevation;

Fig. 3 is an enlarged section taken on the line 3—3 of Fig. 1, the stud being partly in elevation;

Fig. 4 is an under side plan view of the socket member of the fastening device;

Fig. 5 is a section through a socket on the same line as that taken for Fig. 3, but showing a modified structure; and Fig. 6 is another section of a socket similar to that shown in Fig. 5 but showing a still further modified structure.

Referring to the drawing, I have shown a snap fastener structure including a socket member and a stud member particularly, though not exclusively, adapted for use as a slide fastener for straps and the like. Either the stud or the socket may be adapted for slidable attachment to the strap and the other member may be fixed to the other end of the strap or other suitable carrying medium or it may be adapted for slidable attachment.

In the devices selected for illustration of my invention I have shown sockets formed from single pieces of metal and having flat plate portions 1 at opposite ends of which are located strap-receiving slots 2—2. Between the slots the metal of the plate portion 1 is depressed to form a cup-shaped portion 3 (Figs. 3 and 4) having an aperture 4 in the bottom thereof which extends through one side of the cup-shaped portion 3 adjacent to an edge of the socket which is at right angles to the edges parallel with the slots 2—2. The socket is also provided with a yieldable finger 5 formed from the material cut out to provide the aperture 4 and preferably remaining in substantially the same plane as the plate portion 1, as best illustrated in Fig. 2.

The stud member has a head 6 and a neck 7, the head being somewhat larger in diameter than the neck, as clearly illustrated in Figs. 2 and 3.

Since the head 6 of the stud may enter freely through the aperture in the side of the cup-shaped portion 3 of the socket and the neck 7 may enter freely in that portion of the aperture in the bottom of the cup-shaped portion 3 by a lateral approaching movement of the stud toward the socket, some means is necessary to hold the stud and socket against accidental separation when thus engaged. The particular means which I have illustrated includes a projection 8 adjacent to the free end of the finger 5 (Figs. 2 and 4) and a recess 9 formed in the head of the stud.

When my improved fastening members are used in a complete installation, as illustrated in Figure 1, they may be readily engaged and separated by a lateral movement transverse to the line of stress exerted lengthwise of the strap 10. The head 6 of the stud is larger in diameter than the width of the aperture 4 so that when the head is completely engaged in the socket it cannot be separated therefrom by stresses exerted axially of the stud and socket. The neck of the stud is substantially the same size as the width of the aperture 4 so that when stresses are exerted upon the fasteners in a line longitudinally of the strap 10 those stresses will be exerted at a point where the wall of the bottom of the depressed portion adjacent to the aperture is brought into contact with the neck 7 of the stud. The relative movement of the socket relative to the stud when under normal stresses in use is such that the neck 7 and wall just referred to contact before there can be any disengagement of the projection 8 from the recess 9. Therefore, the fastener can be separated only by a lateral movement of the socket relative to the stud in a line substantially transverse to the line of normal stress.

Heretofore slide fasteners of the separable type have been adapted to be engaged by direct axial movement of one toward the other and when those fasteners are of the simple snap fastener type it has been found that they would accidentally separate under normal stresses exerted longitudinally relative to the strap. My improved fastener cannot possibly become separated by any normal stresses exerted during the use of the fastener and the detent means provided by the spring finger 5 and the head 6 of the stud prevents accidental separation of the fastening members in the direction in which they may be separated.

My improved fastener is simple, durable and relatively inexpensive to manufacture. It can be used on straps of gloves, shoes and the like without regard to whether or not it is on a right-handed or a left-handed article, since the fastener members are engaged and disengaged by a straight, lateral movement of one relative to the other.

In Figs. 5 and 6 the socket is shown with a cup-shaped portion 3 the same as in that shown in Fig. 3 but with differently shaped bottom walls.

In Fig. 3 the bottom wall 11 is parallel with the plate portion 1. In Fig. 5 the bottom wall 12 is sloped throughout its length with relation to the plate portion 1. Thus the bottom wall 12 is spaced a greater distance from the plate portion 1 at the side opening than the thickness of the head 6 of the stud.

In Fig. 6 the bottom wall 13 is stepped to provide a widely separated portion adjacent to the entrance for the head 6 and the portion 14 between the steps is sloped to cam the socket relative to the head onto the other step portion of the wall 13.

The socket structures shown in Figs. 5 and 6 are useful to the extent that the head 6 of the stud may enter quite freely above the bottom of the cup-shaped portion 3 and then be cammed into position by the shape of the bottom wall.

While I have illustrated and described a preferred embodiment of my invention, I do not wish to be limited thereby because the scope of my invention is best defined by the following claims.

I claim:

1. A slide fastener socket formed from sheet metal and having a base provided with strap-receiving slots at opposite ends thereof, a cup-shaped portion formed in said base between the slots, said cup-shaped portion having an aperture in the bottom thereof and opening through a side of said cup-shaped portion which is unslotted to admit the head and neck of a stud by lateral approaching movement transverse to the direction of the straps when passing through said slots, a spring finger above said aperture and one element of a detent means presented by said spring finger for snap fastening engagement with cooperating detent means carried by the stud.

2. A slide fastener comprising, in combination, a socket having a plate portion provided with strap-receiving slots at opposite ends thereof, a depressed central portion open at the bottom and at one side, the open side being toward an unslotted side of the socket plate portion, a spring finger in the plane of said plate portion extending above the open bottom of the depressed portion and inwardly from the open side, and said bottom of said cup-shaped portion adjacent to said stud-receiving opening being tapered relative to said plate portion so that the head of the stud may enter freely into the cup-shaped portion and then, upon continued entrance movement, be cammed into engagement with said yieldable finger.

3. A slide fastener comprising, in combination, a socket having a plate portion provided with strap-receiving slots at opposite ends thereof, a depressed central portion open at the bottom and at one side, the open side being toward an unslotted side of the socket plate portion, a spring finger in the plane of said plate portion extending above the open bottom of the depressed portion and inwardly from the open side, and said bottom of said cup-shaped portion adjacent to said stud-receiving opening being step-shaped with a connecting camming portion so that the head of the stud may enter freely into the cup-shaped portion and then, upon continued entrance movement, be cammed into engagement with said yieldable finger.

GUSTAV JOHNSON.